(12) United States Patent
Grove et al.

(10) Patent No.: US 11,586,872 B2
(45) Date of Patent: *Feb. 21, 2023

(54) METAL FASTENER WITH EMBEDDED RFID TAG AND METHOD OF PRODUCTION

(71) Applicants: Pilgrim Screw Corporation, Providence, RI (US); Rhode Island Council on Postsecondary Education, Warwick, RI (US)

(72) Inventors: Geoffrey Grove, Providence, RI (US); Tao Wei, Kingston, RI (US); Otto Gregory, Kingston, RI (US)

(73) Assignees: Pilgrim Screw Corporation, Providence, RI (US); Rhode Island Council on Postsecondary Education, Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,236

(22) Filed: Aug. 2, 2021

(65) Prior Publication Data

US 2021/0357721 A1 Nov. 18, 2021

Related U.S. Application Data

(63) Continuation of application No. 16/859,873, filed on Apr. 27, 2020, now Pat. No. 11,080,584, which is a continuation of application No. 16/246,317, filed on Jan. 11, 2019, now Pat. No. 10,635,963.

(60) Provisional application No. 62/774,132, filed on Nov. 30, 2018, provisional application No. 62/616,279, filed on Jan. 11, 2018.

(51) Int. Cl.
*G06K 19/077* (2006.01)

(52) U.S. Cl.
CPC . *G06K 19/07758* (2013.01); *G06K 19/07771* (2013.01); *G06K 19/07773* (2013.01); *G06K 19/07794* (2013.01)

(58) Field of Classification Search
CPC ............... G06K 19/07758; G06K 19/07773
USPC ........................................... 235/492
See application file for complete search history.

(56) References Cited

U.S. PATENT DOCUMENTS

| | | | | |
|---|---|---|---|---|
| 7,412,898 B1* | 8/2008 | Smith | ............. | F16B 31/025 73/761 |
| 7,612,671 B2* | 11/2009 | Rachwalski | ....... | G06K 19/0723 340/568.1 |
| 8,584,957 B2* | 11/2013 | Zhu | ............. | F16B 31/02 73/761 |
| 2006/0022056 A1* | 2/2006 | Sakama | ........... | G06K 19/07771 235/492 |
| 2006/0232408 A1* | 10/2006 | Nycz | ............. | A61B 90/90 340/572.1 |
| 2008/0122620 A1* | 5/2008 | Rachwalski | ....... | G06K 19/0723 340/572.1 |
| 2009/0184719 A1* | 7/2009 | Ko | ............. | G01R 29/0821 343/703 |

(Continued)

*Primary Examiner* — Paultep Savusdiphol
(74) *Attorney, Agent, or Firm* — Virtual IP Law, LLC

(57) ABSTRACT

The present disclosure is generally directed to an RFID tag for use with a metal fastener where the fastener operates as the antenna of the RFID tag. The RFID tag includes a microchip for storing data. The chip is electrically coupled to the metal fastener in order to receive and transmit the RF signal, the metal fastener thereby operating as the antenna for the RFID tag.

20 Claims, 12 Drawing Sheets

(56) References Cited

U.S. PATENT DOCUMENTS

| | | | | |
|---|---|---|---|---|
| 2012/0157006 A1* | 6/2012 | Hong | ............... | H01Q 1/2225 |
| | | | | 455/67.14 |
| 2012/0249169 A1* | 10/2012 | Voutilainen | ......... | G06K 7/0008 |
| | | | | 324/750.01 |
| 2012/0298758 A1* | 11/2012 | Vishwanath | ........... | A61B 90/98 |
| | | | | 235/492 |
| 2013/0186951 A1* | 7/2013 | Zhu | ..................... | F16B 31/02 |
| | | | | 235/375 |
| 2018/0012047 A1* | 1/2018 | Chu | ..................... | F16B 1/0071 |

\* cited by examiner

```
%%
freq = linspace(800e6, 1e9, 1601); %frequency range
r=.7e-2; %radius, meters
w=4*r; %convert cyclindrical radius to flat width for model
l=6.8e-2; %length of screw in meters GPL=1.5*l; %meters
GPW=1.5*l; %meters antenna=monopole('Height',l,'Width',w,'GroundPlaneLength',GPL,'GroundPl
anewidth',GPW); %original model z=impedance(freq,antenna); %record the resistance value at the
frequency where reactance = 0 as 'load';
%%
load=20;%example load value
s=sparameters(antenna,freq,load); %calculate S-parameters for antenna
with load
rfplot(s); %plot S-parameters in dB vs. Frequency URL: https://www.mathworks.com/help/antenna
```

FIG. 6

| BASELINE SPECIFICATION | |
|---|---|
| RFID READER | ALR-H450 |
| RFID POWER | EPC C1 GEN2/ISO18000-6C |
| | 1W (+54Bm TO +30dBm) |
| ANTENNA | 1 diL/4 dBic (CIRCULAR) |
| SCANNER | 2-D BAR CODE (1280 x 960 PIXELS) |
| WLAN | WIRELESS WLAN 802.11 b/g/n |
| WWAN | WCDMA/HSDPA (850/1900/2100MHz)<br>GSM/GPRS/EDGE (850/900/1800/1900MHz)<br>1 PSAM + 1 SIM |
| WPAN | BLUETOOTH v2.1+EDR, v3.0+HS AND v4.0 |
| LOCATION SERVICES | GPS (EMBEDDED A-GPS) |
| COMMUNICATIONS | MICRO USB |
| OPERATING SYSTEM | ANDROID 4.4.2 (KITKAT) |
| DISPLAY | 4" TFT-LCD TOUCH SCREEN WITH BACKLIGHT, 16.7M COLORS, 480 x 800 (WVGA) |
| CPU | CORTEX-A7 1.3GHz QUAD-CORE |
| MEMORY | 1GB RAM / 4GB FLASH |
| MEMORY EXPANSION | MICROSD (32GB MAX) |
| BATTERY (LITHIUM POLYMER) | MAIN 3.7V, 3200 mAh<br>GUN 3.7V, 5200 mAh |
| EXPANSION SLOT | 1 MICRO SD SLOT, 1 SIM SLOT, 1 PSAM SLOT |

| PHYSICAL CHARACTERISTICS | |
|---|---|
| INGRESS PROTECTION | IP64 |
| ESD | CONTACT ±4KV / ±AIR 8KV |
| HUMIDITY | 0-95% AT 40°C / 104°F |
| OPERATING TEMP | -10°C TO 50°C / 14°F TO 122°F |
| STORAGE TEMP | -40°C TO 70°C / -40°F TO 158°F |
| WEIGHT | 371 G / 13.1 OZ (NO BATTERIES)<br>448 G / 15.8 OZ (WITH MAIN BATTERY)<br>623 G / 22.0 OZ (WITH GUN HANDLE AND ALL BATTERIES) |
| DIMENSIONS WITHOUT GUN HANDLE | 7.28" (L) x 3.35" (W) x 4.13" (H)<br>185 MM (L) x 85 MM (W) x 105 MM (H) |
| DROP | 1 METER / 3.28 FEET |

FIG. 11

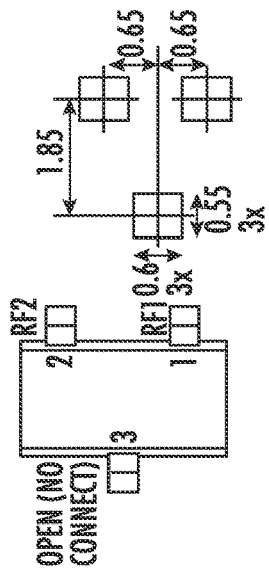

| PIN # | PIN NAME | DESCRIPTION |
|---|---|---|
| 1 | RF1 | RFID ANTENNA RF CONNECTION |
| 2 | RF2 | RFID ANTENNA RF CONNECTION FOR DIFFERENTIAL ANTENNA OR GND FOR SINGLE ENDED DESIGNS |
| 3 | OPEN | DO NOT CONNECT |

FIG. 12

| PARAMETER NAME | UNITS | MAXIMUM RATING | CONDITIONS | COMMENTS |
|---|---|---|---|---|
| ESD WITHSTAND CAPABILITY (HBM) | VPEAK | 2000 | +25 °C | SURVIVE 3 POSITIVE AND 3 NEGATIVE EVENTS AT THE RATED VOLTAGE WITH NO PERFORMANCE DEGRADATION |

| PARAMETER | SYMBOL | UNITS | MIN | TYP | MAX | CONDITIONS | COMMENTS |
|---|---|---|---|---|---|---|---|
| STORAGE TEMPERATURE | $T_{STOR}$ | °C | -50 |  | 85 |  |  |
| NOMINAL OPERATING TEMPERATURE | $T_{NOM}$ | °C | -50 | 25 | 85 |  |  |
| RELATIVE HUMIDITY |  | % |  |  | 98 |  | NON-CONDENSING |
| DIE SIZE, PER SIDE |  | μM | - | 589.5 | - |  | PACKAGED IN TAG CENTER TO CENTER DIE PITCH ON WAFER |

| PARAMETER | SYMBOL | UNITS | MIN | TYP | MAX | CONDITIONS | COMMENTS |
|---|---|---|---|---|---|---|---|
| RF FREQUENCY | RF | MHz | 860 | 915 | 960 | 25 °C | @MINIMUM OPERATIONAL POWER |
| RF PARALLEL EQUIVALENT INPUT CAPACITANCE | $C_{IN}$ | pF |  | 0.85 (CHIP ALONE) 0.95 (SOT/TAG) 0.89 (STRAP) |  |  |  |
| RF PARALLEL EQUIVALENT INPUT RESISTANCE | $R_{IN}$ | KΩ |  | 1800 |  |  |  |
| MINIMUM RF COMMUNICATION POWER | $P_{COM(MIN)}$ | dBm |  | -20.5 |  | TARI=25μS, 25 °C | WITH 2dBm DIRECTIVITY OF DIPOLE |
| MINIMUM RF PROGRAMMING POWER | $P_{P(MIN)}$ | dBm |  | -17 |  | 25 °C @ MATCHED PARAMETERS AS SPECIFIED FOR EXAMPLE IN FIG 5.1 | WORD WRITE (16-BITS), WITH 2dBm DIRECTIVITY OF DIPOLE |
| NVM USE MODEL |  | CYCLES | 100,000 |  |  | AT 25 °C |  |
| NVM DATA RETENTION |  | YEARS | 50 |  |  |  |  |

METAL FASTENER WITH EMBEDDED RFID TAG AND METHOD OF PRODUCTION

RELATED APPLICATIONS

This patent is a CONTINUATION of U.S. patent application Ser. No. 16/859,873, filed Apr. 27, 2020, which is a CONTINUATION of U.S. patent application Ser. No. 16/246,317 filed Jan. 11, 2019, which claims priority to U.S. provisional application 62/616,279 filed Jan. 11, 2018, and U.S. provisional application 62/774,132, filed Nov. 30, 2018. All references cited in this section are incorporated here by reference in their entirety.

TECHNICAL FIELD

This invention relates generally to a metal fastener, and more specifically to a metal fastener having a radio frequency identification (RFID) tag embedded in the head or body of the fastener, where the metal fastener operates as the antenna for the RFID tag.

BACKGROUND

Radio frequency identification systems (RFID) are a form of wireless communication that utilizes radio waves to identify and track objects. Each tag carries a unique identification number; which is programmed at the time of manufacturing to ensure the object carries a distinctive identity and description. Conventional RFID systems, such as the one shown in FIG. 1, typically include a reader (or an interrogator) and a tag (or transponder). The tag includes a microchip that stores data and an attached antenna. FIG. 2 illustrates a prior art RFID tag with a simple dipole antenna structure 3. The tag 1 includes a chip 2 coupled to the dipole antenna structure 3, which includes of a pair of antenna elements 4 and 5 supported on a substrate 6.

RFID tags can be attached to an object, i.e. substrate, and can store or transmit information concerning the object, such as a unique identifying number, object status such as opened or unopened, location, and the like. There are two different methods of communicating with an RFID tag—near-field and far-field, with the main difference between the two methods being the reading distance. Near-field communication is conventionally defined as having distances of less than 1.5 m, while far-field communication is more than 1.5 m. Additionally, RFID tags may be passive, active, or semi-active.

Near-field communication (NFC) transmits data either through inductive coupling between the reader and the tag, or through capacitive coupling, with inductive coupling being more popular in use. Inductive coupling involves the use of a magnetic field to energize the RFID tag. A magnetic field is created in the near-field region that allows the RFID reader's antenna to energize the RFID tag, which then responds by creating a disturbance in the magnetic field that the reader will then detect. Capacitive coupling is less common than inductive coupling in NFC and utilizes a quasi-static electric field between the reader antenna and the tag antenna.

Far-field communication (FFC) involves sending and receiving electromagnetic (EM) waves, typically through the use of capacitive coupling (or propagation coupling). The reader transmits a signal that is then reflected off the tag and returned to the reader. By modulating the load on the tag, data can be encoded in the modulating reflected signal. Compared to NFC, the reading distance for FFC is typically more than 1.5 m.

Passive tags have no power source and instead draw power from the field created by the reader and use the energy from the field to power the microchip's circuits. With passive RFID, the RFID tag is irradiated with radio frequency waves from the RFID reader. The RFID tag uses the energy from the radio frequency waves to emit an RFID signal, containing the RFID tag identification location or other data, back to the RFID reader. The RFID reader then receives the RFID tag information and software can be used to interpret the information on the tag, such as calculate a tag's location.

Active tags have a power source and broadcast their signal at set intervals rather than relying upon signals from the reader. Active RFID tags have an independent onboard power source, such as a battery, or are connectable to one. Active RFID tags can transmit the Radio Frequency signal autonomously, at a selected time or at programmed triggers, for example, from a temperature sensor. The power source on active RFID tags also gives them a longer range than passive RFID tags.

Semi-active tags, like active tags, also have a power source, but differ in that they wait for a reader to communication with them, similar to passive tags. Also similar to passive tags, these tags utilize the power from the reader's transmission to communicate back to the reader. Compared to passive tags, semi-active tags contain more complex electronics and are thus more expensive, but can be read from a farther distance, faster and through opaque materials.

While there are different types of RFID systems, in most systems the reader sends out electromagnetic waves, which the tag is designed to receive. Depending on the structure, the RFID reader can identify items that are anywhere from a few centimeters to several meters away. The size of the RFID tag's internal antenna is one indicator of the tag's range. Generally, small RFID tags contain small antennas and shorter read ranges, while large RFID tags that contain larger antennas have longer read ranges. Additionally, RFID antennas can be strongly influenced by their surrounding environment. Water can absorb and reflect RF energy and therefore may decrease an RFID system's performance, including read ranges and read rates.

RFID technology has been used in various capacities. For example, RFID technology may be used for identification of products. The microchip in the RFID tag may contain information that aids in identification of the item to which the RFID tag is attached. Unlike bar codes, which require direct line-of-sight for access (i.e., the bar code needs to be visible in order to be scanned), RFID tags can be read by the RFID reader without the need for direct line-of-sight. RFID tags also have greater capabilities than bar codes because much more information can be stored on the RFID tag than can be printed on a bar code.

SUMMARY

In industries such as the aerospace industry, the tracking of parts can be particularly useful as part of quality-control records, and for purposes of recalls and replacement of aging parts. However, currently parts are often tracked by part numbers that are printed on the part, and which are subject to wear, may be particularly small, all of which can create a challenge to accurately and reliably track the parts.

While RFID tags find use with a variety of products and industries, the tag-antenna typically must be placed more than 0.05 wavelengths away from a metal substrate. In applications where an RFID tag is to be attached to a metal substrate, the dipole antenna impedance often becomes too small, and matching becomes problematic. Thus, use of RFID tags with goods having metal substrates imposes unique challenges as opposed to other goods, particularly when the parts made from the substrate are small in size, as is the case with metal fasteners, which may have a head diameter in the range of approximately 3/16"-1/2" and which may have a shaft diameter in the range of approximately 1/8" to 1/4" (shaft diameter).

An RFID tag for use with a metal fastener is disclosed herein where the fastener operates as the antenna of the RFID tag. The RFID tag includes a microchip for storing data the chip being embedded or otherwise secured into the metal fastener. The chip is electrically coupled to the metal fastener in order to receive and transmit the RF signal, the metal fastener thereby operating as the antenna for the RFID tag.

BRIEF DESCRIPTION OF THE DRAWINGS

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments, and are incorporated in and constitute a part of this specification, but are not intended as a definition of the limits of any particular embodiment. The figures, together with the remainder of the specification, serve only to explain principles and operations of the described and claimed aspects and embodiments, but are not to be construed as limiting embodiments. In the figures, each identical or nearly identical component that is illustrated in various figures is represented by a like numeral. For purposes of clarity, not every component may be labeled in every figure.

FIG. 6 illustrates exemplary code for theoretical reflection coefficient data calculated using the MATLAB Antenna Toolbox for comparison with an RFID fastener in accordance with the present disclosure;

FIG. 11 shows the specification for the ALR-H450 RFID reader by Alien;

FIG. 12 shows the specification for the Higgs 4 chip by Alien;

DETAILED DESCRIPTION OF THE ILLUSTRATIVE EMBODIMENTS

The examples of the apparatus discussed herein are not limited in application to the details of construction and the arrangement of components set forth in the following description or illustrated in the accompanying drawings. It will be understood to one of skill in the art that the apparatus is capable of implementation in other embodiments and of being practiced or carried out in various ways. Examples of specific embodiments are provided herein for illustrative purposes only and are not intended to be limiting. Also, the phraseology and terminology used herein is for the purpose of description and should not be regarded as limiting. Any references to examples, embodiments, components, elements or acts of the apparatus herein referred to in the singular may also embrace embodiments including a plurality, and any references in plural to any embodiment, component, element or act herein may also embrace embodiments including only a singularity (or unitary structure). References in the singular or plural form are not intended to limit the presently disclosed apparatus, its components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. As used herein, the term "fastener" refers to any mechanical device that joins or secures two or more objects together and is not limited to the particular style of fasteners disclosed or illustrated herein.

The present disclosure is directed to a fastener associated with an RFID tag including a semiconductor chip. The semiconductor chip is in communicative connection with the fastener, and at least part of the RFID tag can be embedded within or otherwise attached to the fastener, including on a surface thereof. In some embodiments the antenna that is traditionally part of an RFID tag is eliminated and, instead, the fastener itself acts as the antenna. When acting as an antenna, the fastener transmits modulated RF signals from the RFID semiconductor chip to an external receiver, as would be known of those to skill in the art.

In accordance with one embodiment of the present disclosure, an individual RFID tag with an integrated circuit in the form of a semiconductor chip is attached, i.e. secured to a fastener. The RFID tag can be attached to the fastener at any location, such as on the head or on the shaft of the fastener, as shown in one example embodiment in FIGS.

Figure 1:
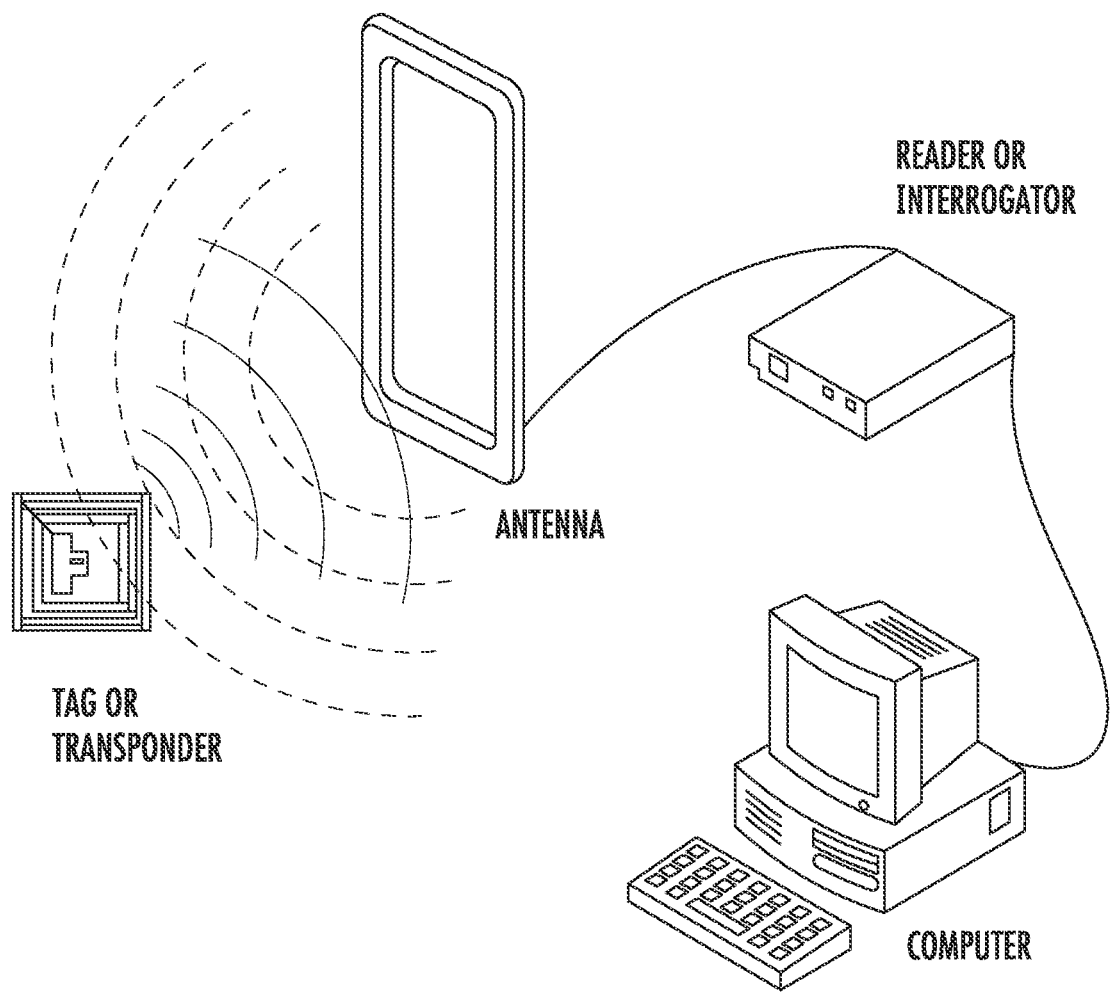
FIG. 1 is a schematic view of a prior art RFID system.
Figure 2:
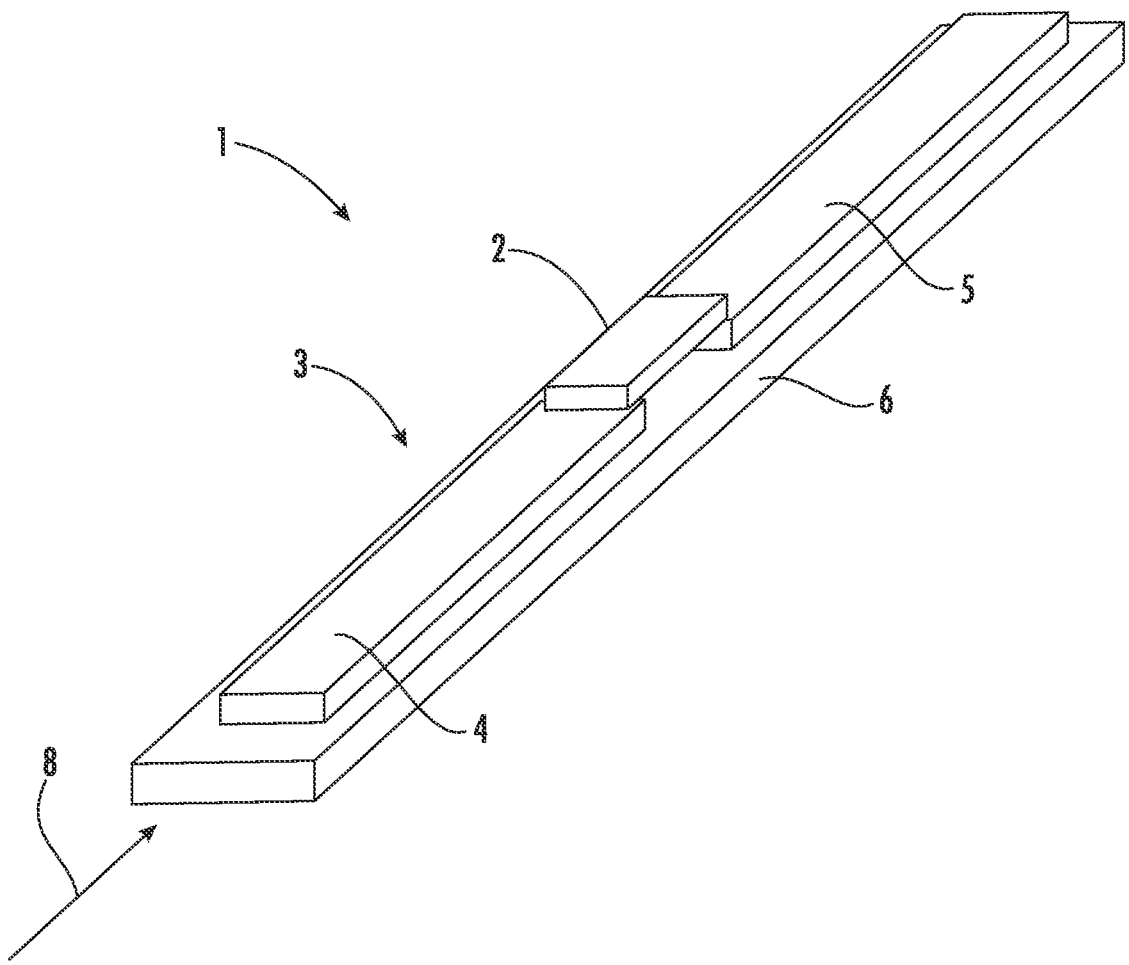
FIG. 2 is a perspective view of a prior art RFID tag.
Figure 3A:
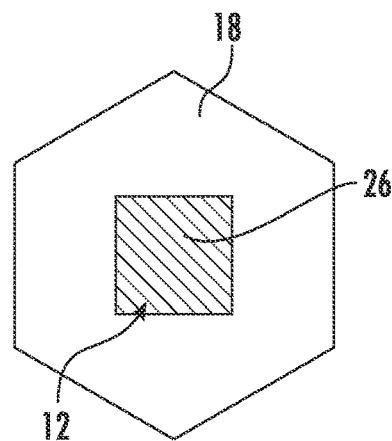
FIG. 3A is a top view of a fastener including an RFID tag in the head (RFID fastener), in accordance with a first embodiment.
Figure 3B:
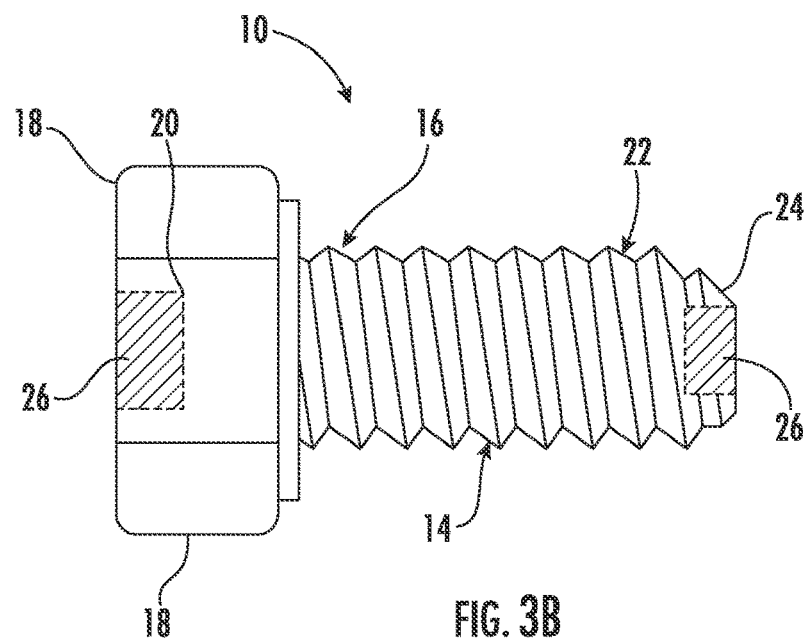
FIG. 3B is a side, perspective view of the RFID fastener of FIG. 3A, illustrating the RFID tag in both the head and the shaft of the fastener.
Figure 3C:
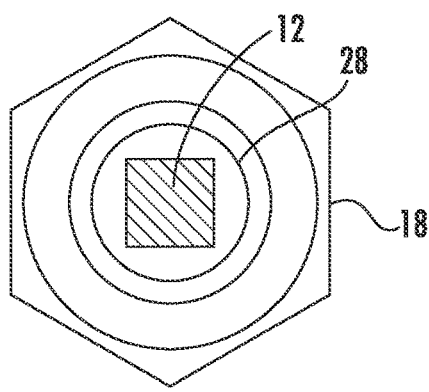
FIG. 3C is a bottom view of the RFID fastener of FIG. 3A including an RFID tag in the shaft.
Figure 4:
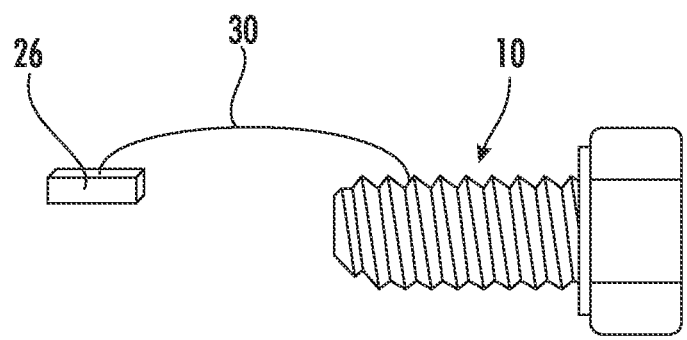
FIG. 4 is a side perspective view of a second embodiment of a fastener in communicative connection with an RFID tag, in accordance with the present disclosure.

3A-3C. For example, as shown in FIG. 3A, the RFID tag 12 has a circuit/chip 26 embedded in the head 18 of fastener 10, such that the tag 12 is generally flush with the surface of the head 18. In this embodiment the chip 26 is also embedded in the shaft 14 toward the distal end 22 of the shaft, as shown in FIGS. 3B and 3C, such that the tag is generally flush with the surface 24 of the distal end 22, and does not extend past the distal most end of the threads 28. An exemplary embodiment of the chip is further shown in the schematic of FIG. 4, where the chip 26 is separate from the fastener 10, but in communicative connection via one or more wires 30 or connection pins (not shown) to the fastener, which is acting as the antenna.

Fastener 10 can be any of a variety of different types of fasteners. In the present exemplary embodiments, fastener 10 is a screw that is shaped and sized in accordance with its intended use. Examples of other types of fasteners and their components include, but are not limited to, nails, bolts, rivets, screws, studs, nuts and washers. As shown in FIG. 3B, Fastener 10 has an elongate body or shaft 14 including a proximal end 16 and a distal end 22, opposite the proximal end 16, and a head 18 supported at the proximal end 16 of the shaft 14. The elongate body 14 may be threaded on an outer surface thereof, such as with a screw, or can be smooth, such as with a nail, and can engage with other fastener components such as a washer, nut, sleeve, or other components, as would be known to those of skill in the art. In this embodiment, as can be seen from FIGS. 3A-3C, the head 18 has a diameter that is larger than the diameter of the shaft 14.

The semiconductor chip 26 can be of a conventional construction and can be obtained from any of a variety of manufacturers, including those listed at http://www.rfidtags-.com/manufacturer-directory. The particular specification of the chip can be chosen based upon the particular application, as would be known to those of skill in the art. One example of a suitable commercially available chip is a Higgs 4 chip available from Alien, the specifications of which are provided in FIG. 12 or the current chip versions with updated specifications. Depending upon the application the chip 10 may be passive, active, or semi-active. Likewise, depending upon the application the chip 10 may operate in any of the three frequency ranges in which RFID systems typically operate, namely: 30-400 kHz (low frequency), 3-30 MHz (high frequency) and 300 MHz-1 GHz (ultra-high frequency). In one exemplary embodiment, the chip is a passive chip that operates in ultra-high frequencies. For example, but not limitation, the chip can be a passive chip that operates in approximately the 860-960 MHz range.

The dimensions of the chip 26 can likewise vary depending upon the application. For example, but not limitation, the chip can have a width that is less than about 1.5 cm, including 0.0 cm. The chip can also have a length that is less than about 1.5 cm, or any other length between 0.0 cm and 1.5 cm. In certain embodiments, the width and length of the chip is determined such that the entire chip fits on or within the desired mounting location of the fastener without extending past the surface of the fastener.

The chip 26 is loaded to contain information about fastener 10 that can be easily read by an electronic device and displayed, as is conventional. Chip 26 may include information related to fastener 10 such as the manufacturing information, for example the part manufacturer, serial number, product part number, lot history, recall or other historical information, instructions for use, or other information that can be displayed to an operator. The chip 26 may also include information regarding the status or performance of the fastener 10, such as whether the fastener has become loose or is no longer in place, if desired. The chip 26 can also be in communicative connection with one or more sensors, such as, for example and not limitation, acoustic, sound, vibration, air flow, temperature, radiation, steam, stress, pressure, torque, displacement, chemical, pH, electromagnetic and/or ultrasonic wave, and current sensors, and/or any other type of sensor, as desired. The information from chip 26 of the RFID tag can also be easily added to an electronic record. Accordingly, RFID chip 26 can assist in tracking during manufacturing and after installation of the fastener, improving traceability of the fastener, providing information about the fastener, assisting in the determination of the need for maintenance, adjustment or replacement of the fastener, and assisting in the monitoring of the environment in which the fastener is located in a convenient and reliable manner.

The microchip 26 is integrated into any of a variety of conventional fastener designs using current manufacturing techniques, such as by counterboring a hole 20 within the head 18 and/or shaft 14 of the fastener 10, or by securing the microchip to the surface of the head 18 and/or shaft 14 of the fastener 10. The embedded RFID chip does not interfere with the operation of the fastener 10 because the fastener still operates and functions in the same manner with or without the embedded microchip 26.

The microchip 26 may be attached to the metal fastener using any method known in the art. For example, in an example embodiment, the RFID chip 26 may be welded/soldered to the nut, bolt, and/or fastener. In another example embodiment, the RFID chip 26 may be attached using, for example, industrial adhesives.

Utilizing the RFID chip 26 with the fastener 10 as the antenna to produce an RFID tag provides a reliable solution, for traceability, anti-counterfeiting, sorting, post-disaster identification purposes, inventory control, maintenance, or anti-theft, particular in industries such as the aerospace and automotive industry where recalls and post-disaster identification purposes can be time-consuming with conventional methods. The fastener 10 operating as the antenna also solves issues in the prior art concerning interference caused by the metal of the fastener, and provides a new and reliable solution to for traceability, sorting, inventory control, etc. as enumerated above.

The ability of the fastener 10 to function as an antenna can depend upon a number of factors. Some of these factors include, but are not limited to, the conductivity of the material, an electrical connection to the fastener, and what is known as the "skin effect"—the tendency of current from the generated RF to travel on the outer layer of conductive material.

The fastener 10 may be fabricated entirely, or in part, out of an electrically conductive metallic material, in order to reduce the loss of RF energy as the current travels to the chip 26. In certain embodiments, the entire fastener 10 is fabricated out of an electrically conductive metallic material. In other embodiments, only a portion of the fastener 10 is fabricated out of an electrically conductive material. For example, but not limitation, in one embodiment, only an outer layer of the fastener 10 is fabricated out of an electrically conductive material.

The electrically conductive material in one embodiment can have a resistance less than about 5 ohms. In one embodiment, the electrically conductive material has a resistance less than about 1 ohm. Examples of electrically conductive material include, but are not limited to, titanium, A-286, nickel-chromium alloys, such as Inconel™, other super alloys, stainless steel, alloy steel, aluminum, zinc-coated steel, titanium nitride-coated titanium, and naval brass, to name but a few, and may be fabricated in a facility that is certified to Quality Standards AS9100 and ISO9001, or the current versions of these standards. For example, but not limitation, in one embodiment, the fastener material is zinc-coated steel.

In addition to the above, the width (e.g. diameter) and length of the fastener 10 also affects the fastener's ability to function as an antenna. In one embodiment, for example, but not limitation, the approximate length of the fastener can be determined by one of ordinary skill in the art, based on the desired frequency range and the desired radius of the fastener using the following three equations as they apply to cylindrical monopole antenna models:

$$\text{Length} = .24\lambda * \frac{l/a}{1 + l/a} \quad \text{Equation (1)}$$

$$l = \lambda/4 = c/4f_c \quad \text{Equation (2)}$$

$$\text{Length} = .24\frac{c}{fc} * \frac{c/4afc}{1 + c/4afc} \quad \text{Equation (3)}$$

Equation 1 gives the ideal length given a known desired center frequency, where l is the length of a monopole with a theoretical radius of zero that is determined by Equation 2, and a is the radius of the monopole cylinder. Combining Equations 1 and 2 yields Equation 3, which can help predict the length of the fastener given the desired center frequency, fc, and the desired radius. The constant c is the speed of light, 300,000,000 m/s.

For example, if the desired frequency range was determined to be 902-928 MHz and the desired radius of the screw was 5 mm, using Equations 1-3, and the range of optimal lengths would be from 7.31-7.52 cm.

The fastener 10 may be suited for use by any type of customer, including end-users, commercial, and government customers. The customers can span any number of industries/fields, such as, but not limited to, the military (for example, military airframe manufacturing) aerospace (for example, commercial airframe manufacturing, and aerospace propulsion manufacturing), automotive, railway, maritime, medical, sports, nano-technology, computer, and construction industries/fields. In one embodiment, the fasteners are for use in the aerospace industry, such as for airframes, including fixed or rotary wings, or spacecrafts, including transport structures, satellites, and off-Earth habitats.

Figure 5:
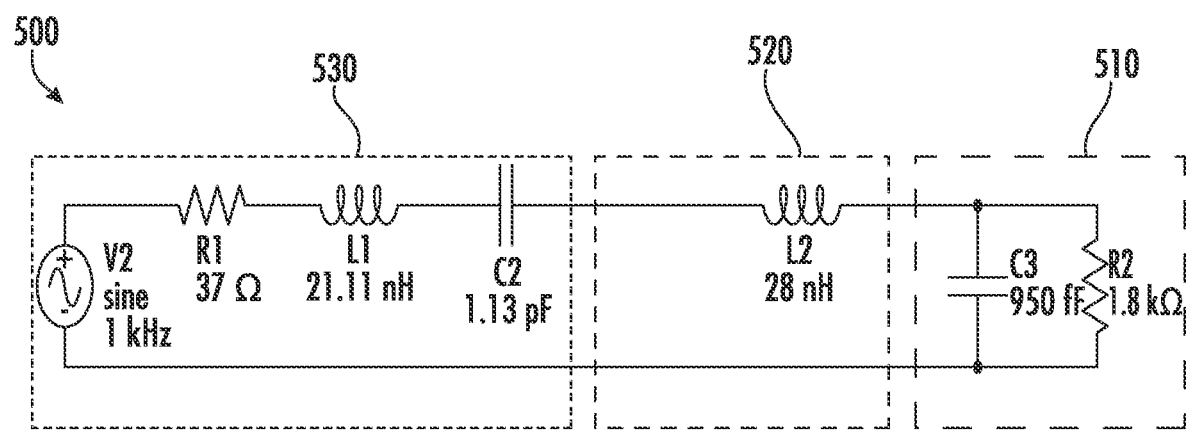
FIG. 5 is a schematic view of a circuit of an RFID tag, showing an antenna, network, and RFID chip, in accordance with an exemplary embodiment for use with a fastener according to the present disclosure.

In certain embodiments, an impedance-matching device, or matching network, can be used to optimize the power transfer between the chip 26 and the antenna. Any one or combination of transformers, resistors, inductors, capacitors, and transmission lines can be used. In one embodiment, the matching network is an inductor, which can be, but is not limited to, the use of a wire connected at either end to the chip 26 and the fastener 10, such that it forms a loop. An exemplary circuit representation 500 of the three components—the chip 510, the antenna/fastener 520 and the matching network 530—can be seen in FIG. 5.

An external reader is configured to read and retrieve the electronic information stored by the semiconductor chip 26. The semiconductor chip 26 may be passively powered, such that the metal fastener 10 performing as the antenna receives RF energy from the external reader to permit the RFID integrated circuit 26 to be powered without a physical connection to a power supply. Thus, the RFID tag is highly integrated and compact enough to function within the confines of the dimensions of the fastener. This provides a cost-effective alternative to a traditional RFID tag and antenna. For example, the RFID tag may be integrated during the manufacturing of the nut, bolt, and/or fastener and may also be sealed with a protective substance to further protect the RFID tag. In this embodiment, the metal interference and signal reflection of the fastener is used for longer read range of the RFID tag.

With respect to the RFID reader, any reader that is capable of obtaining information using radio waves from the RFID tag is suitable, and optionally communicating the information contained in the tag to software. RFID readers are usually associated with a range from which the tag can be read. Most readers typically have ranges that fall somewhere between about one to about one hundred meters. Similar to RFID tags, readers have antennas. The two most common types of antennas are linear-polarized or circular polarized. The antennas used in the reader depend on the read range of the tags, e.g. NFC or FFC. RFID readers can be, but are not limited to, wireless, fixed, handheld, and/or USB powered. Examples of commercial RFID reader manufacturers include, but are not limited to, Alien, Avery Dennison, Confidex, Fujitsu, Geoforce, Harting, HID Global, Indentix, Impinj, Invengo, Kathrein, Keonn, Laird Technologies, MTI Wireless Edge, Omni-ID, RFMAX, SATO, Seeonic, SLS, SMARTTRAC, Tageos, ThingMagic, Times-7, TransCore, TSL, Turck, Vulcan, Xerafy, Zebra. An example of a reader capable of reading distances up to between 9 m and 15 m, depending on the tag, is the Alien ALR-H450 Handheld RFID reader, for which the specifications are provided in FIG. 11, or RFID reader version with updated specifications.

In another embodiment, due to the metallic properties of the fastener, an antenna 28 may be included as part of the RFID tag. The antenna 28 may be, for example, a patch antenna or an inverted-F antenna. Inverted-F antennas can be designed in multiple shapes and designs. In this embodiment, the patch antenna associated with the RFID tag is reduced in size so as not to modify the dimensions of the nut, bolt, and/or fastener beyond tolerance levels.

In another example embodiment, the physical size of the antenna may be reduced by adding meandering sections to an ordinary dipole antenna. Text, in the form of brand names and/or logos may also be used as a meandered line antenna. The reduced size of the antenna and/or RFID tag may also reduce manufacturing costs of the RFID tag. In another example embodiment, certain dimensions of the fastener may be modified to accommodate the dimension of the RFID tag, however that the final dimensions of the fastener should remain the same.

In an example embodiment, the fasteners are tested mechanically for durability, repeatability, and/or robustness (for example, accessibility of the data, amount of data storage, etc.).

The following are examples of prototype testing, and should not be construed as limiting.

EXAMPLES

Example 1—Characterizing the Antenna Behavior of a Fastener

In this example, a zinc-coated steel screw having a diameter of 0.9 cm and a length of 8.0 cm was used as the RFID antenna. In order to characterize the antenna behavior of the screw at the desired UHF range of 860-960 MHz, the reflection coefficient of the screw was determined. The reflection coefficient is the measure of how much of an electromagnetic wave is deflected due to impedance mismatches. The point along the frequency spectrum where the reflection coefficient of an antenna reaches a minimum represents the point where the complex impedance of the antenna is at zero, or is resonant. At this frequency, the power transmitted to the antenna is maximized and signals are best intercepted. Essentially, an antenna acts as a narrow band-pass filter, where the center frequency is determined by the location of the minimum of the reflection coefficient.

To determine the frequency dependent reflection coefficient for the screw, a Vector Network Analyzer (VNA) was used. A VNA is a two-port analysis tool capable of determining the reflection coefficient to a high degree of accuracy along a frequency spectrum. In operation, it sends test signals through a port and then analyzes the returned signals through a different port to determine the reflection coefficient, notated $S_{11}$, of the device under test (DUT), through which the signals travelled.

Typically, antennas are attached to the VNA for testing using a SubMiniature version A (SMA) connector. In order to characterize the screw antennas, a connector was fashioned to attach them to a male SMA connector. This connector consisted of a female SMA on one side and a male banana plug on the end. In order to test each screw, a hole the size of a banana plug was drilled into them. The SMA-banana transformer was then used to connect the screws to the VNA.

In order to get the best results from the VNA, for each round of testing the VNA was calibrated using an automatic electronic calibrator (eCal) that was attached to the VNA using semi-rigid SMA cables. When testing the screw-antennas, the semi-rigid SMA cables were kept in the exact location they resided during calibration. Additionally, the $S_{11}$ data of the SMA-banana connector was saved for each round of testing and subsequently subtracted from the antenna $S_{11}$ data, in order to remove its effect from the data.

The $S_{11}$ data for various screw-antennas was saved from the VNA and the frequency data was separated from the $S_{11}$ data. Next the same series of steps was applied to data from the SMA-banana connector, keeping only the $S_{11}$ data, not the superfluous frequency data. Finally, to get the most accurate $S_{11}$ data for the antennas, the $S_{11}$ of the SMA-banana connector was subtracted from each data point along the frequency spectrum.

In short, the above-described testing process is set forth below in the following steps:
1. Drill a ⅛ inch diameter hole in the screw 1 cm deep
2. Calibrate VNA using semi-rigid SMA cables and an eCal
3. Sand the inside of the hole before using the SMA-Banana connector to attach the screw to port 1 of the VNA
4. Take $S_{11}$ data across the 860-960 MHz frequency spectrum and save the information in a .prn file
5. Use the $S_{11}$ data the minimum point in Equation 4 to find the real impedance, i.e. the resistance $$R_L = Z_o \frac{1+\Gamma_{min}}{1-\Gamma_{min}} \quad (4)$$

6. Use two points along the $S_{11}$ graph and Equation 6 to determine the values of the inductor and capacitor
7. Construct a circuit as shown in FIG. 3

The $S_{11}$ data collected for each antenna was then compared to the theoretical $S_{11}$ data calculated using the MATLAB Antenna Toolbox developed by MathWorks of Natick, Mass. FIG. 6 illustrates exemplary code for theoretical reflection coefficient data calculated using the MATLAB Antenna Toolbox for comparison with an RFID fastener. For this process, first a cylindrical monopole antenna model for the screw was constructed in MATLAB. Next, the impedance of the model antenna was analyzed. Wherever the complex impedance was zero along the frequency spectrum, the real impedance at that frequency was recorded as the theoretical "load" impedance of the antenna. Next when analyzing the $S_{11}$ of the model antenna, the value of the load impedance previously recorded was included. Using this series of steps, the best approximation of the $S_{11}$ of the theoretical cylindrical monopole model of the antenna was found.

In order to obtain a circuit representation of the screw, the reflection coefficient data, $S_{11}$ data, was converted into impedance data along the frequency spectrum.

The first step for this process is determining the real impedance of the screw, which consequently should theoretically match the "load" impedance determined by MATLAB. The antenna has a purely real impedance at the frequency where $S_{11}$ is at an absolute minimum; the point can be seen in FIG. 7 around 840 MHz.

The load impedance, ZL, of the screw was calculated using Equation 5 (by using the reflection coefficient equation) and Equation 6, with the knowledge that the VNA had an impedance of 50 ohms (Zo) the load impedance (ZL), after converting the reflection coefficient from Decibels.

$$\Gamma=[10]^\wedge(\Gamma\_dB/20)=[10[^\wedge(S\_11/20) \quad (5)$$

$$\Gamma=(Z\_L-Z\_o)/(Z\_L+Z\_o) \quad (6)$$

Figure 7:
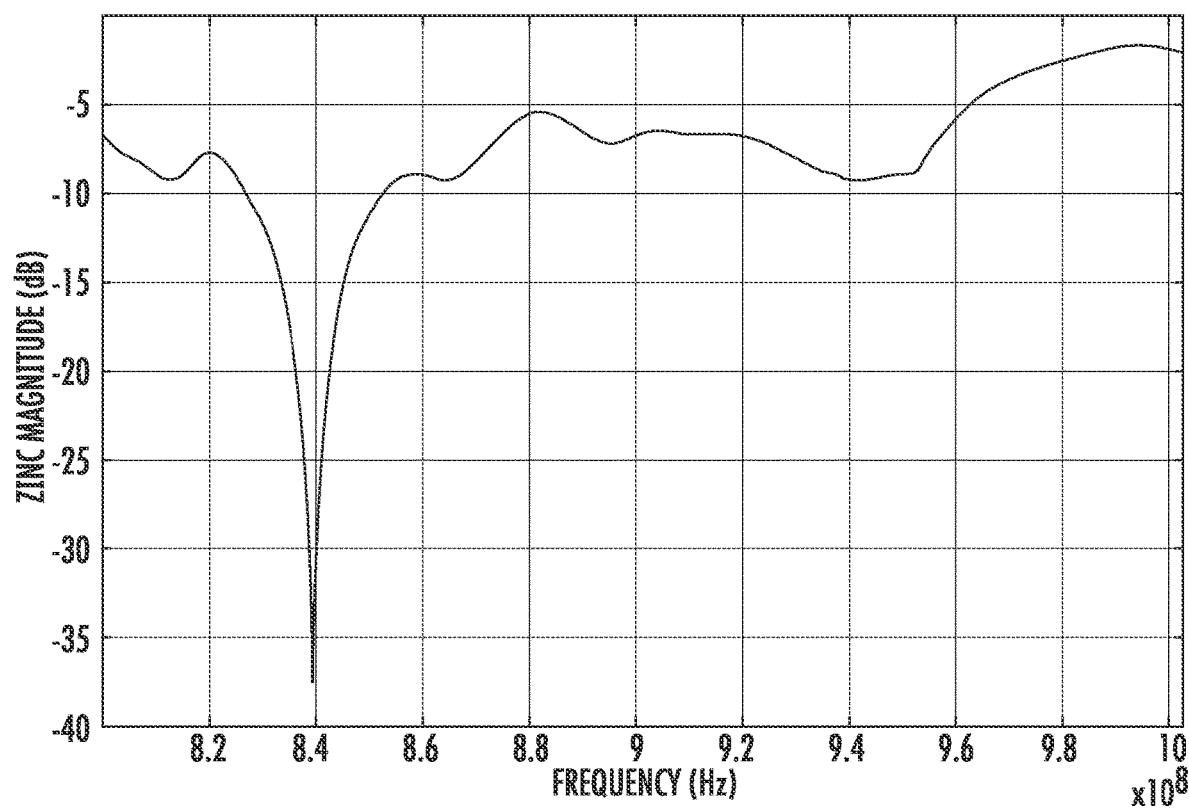
FIG. 7 is a graphical representation of the reflection coefficient data of an RFID fastener in accordance with the an exemplary embodiment.

Next, two points along the $S_{11}$ curve were chosen near either side of the resonance frequency, approximately 840 MHz, shown in FIG. 7. Rearranging the reflection coefficient equation, along with the full impedance equation, Equation 7, yields Equation 8.

$$Z\_L=R\_L+[jX]\_L \quad (7)$$

$$\text{Abs}[(R)\_L+[jX]\_L)=Z\_o(1+\Gamma)/(1-\Gamma) \quad (8)$$

Taking Equation 8 and substituting the impedance, with the impedance of a capacitor, inductor and the previously calculated real antenna resistance in series, Equation 9, ultimately leads to Equation 10.

$$R\_L+jX\_L=R\_a+j\omega L\_a+1/j\omega C \quad (9)$$

$$\omega L-1/\omega C=\sqrt{([Z\_o]^\wedge 2((1+\Gamma)/(1-\Gamma))^\wedge 2-[R\_a]^\wedge 2)} \quad (10)$$

By using the antenna load impedance, the impedance of the VNA, and the S11 value at two frequencies, approximations of the inductor value and capacitor value emerge. Because Equation 10 includes two variables, L and C, two points along the S11 curve are required in order to construct a system of equations to solve for both. When analyzing the point to the left of the resonance frequency the product of the square root (left side of Equation 10) will be negative, and when analyzing the point to the right of the resonance frequency the product of the square root will be positive—this is due to the nature of capacitive and inductive effects around the resonance frequency.

In short, the process for modeling the screw as a cylindrical monopole antenna is set forth in the steps below:
1. Using MATLAB code, replace the length and width with the appropriate values for the screw.

2. Suppress the $S_{11}$ section and find the impedance, record the value of the real impedance at the frequency where the reactance is zero.
3. Use this recorded value as the load impedance, "load" in the code, and calculate the $S_{11}$ data.
4. Repeat steps 5-7 from the last section to convert the $S_{11}$ data into a circuit model.

Figure 13A:
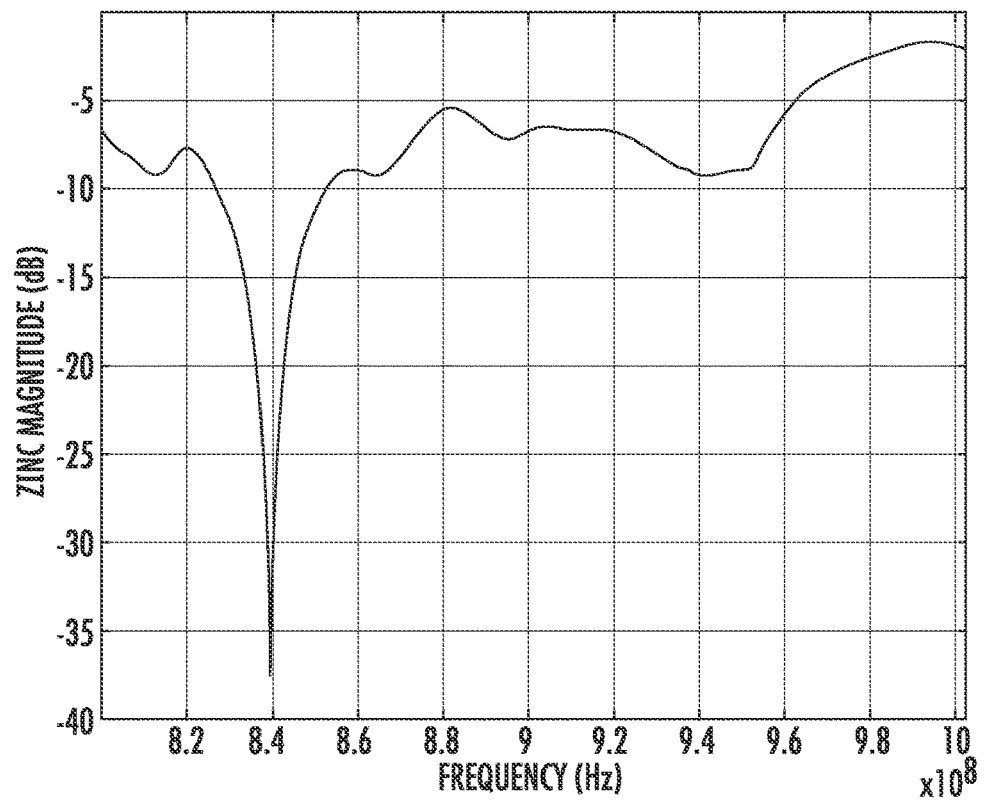
FIGS. 13A and B are graphical representations of reflection coefficient data obtained using a VNA and a theoretical model according to the present disclosure, respectively.
Figure 13B:
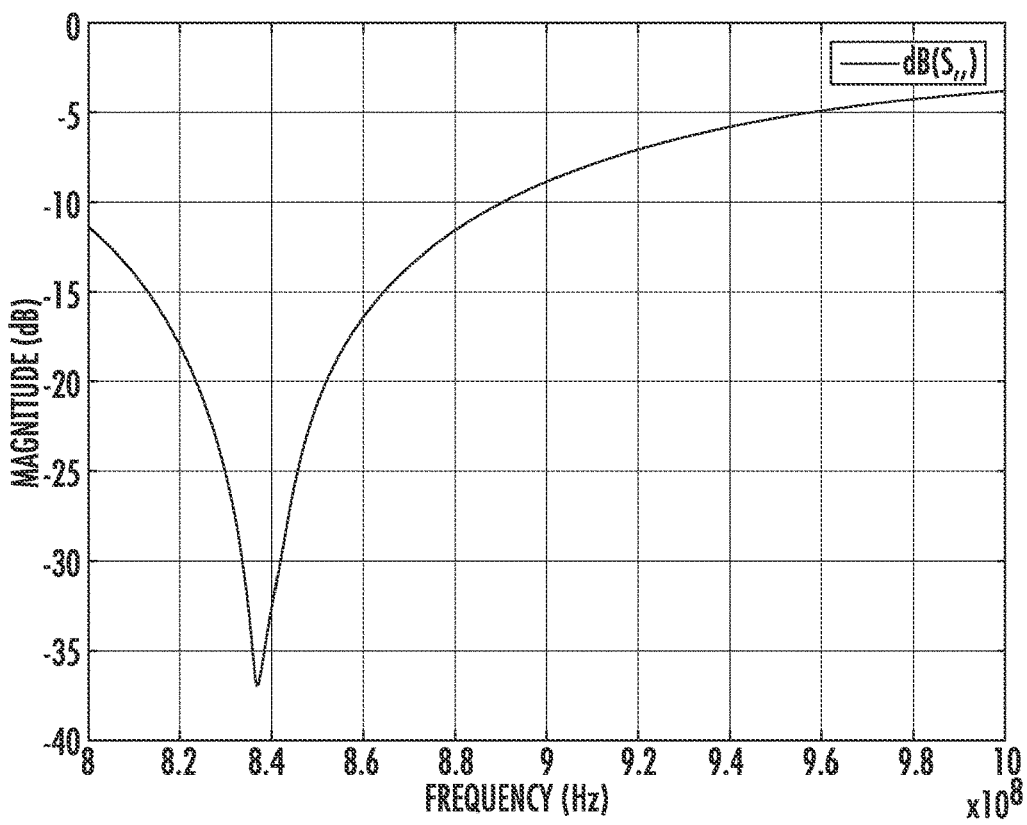

The reflection coefficient data obtained using the VNA and the theoretical model match almost perfectly, as shown in FIGS. 13A and B, respectively, proving that the modeling of a screw as a cylindrical monopole can be an accurate model of the electromagnetic behavior of the screw.

Example 2—Constructing a Matching Network

In order to optimize the power transfer between the RFID chip and the tag antenna (i.e. the screw), a matching network was constructed. In order to determine an optimal inductor value to be used for a matching network, a tunable inductor was placed in the circuit and the value of the inductor was adjusted to maximize the optimal distance of operation.

Figure 8:
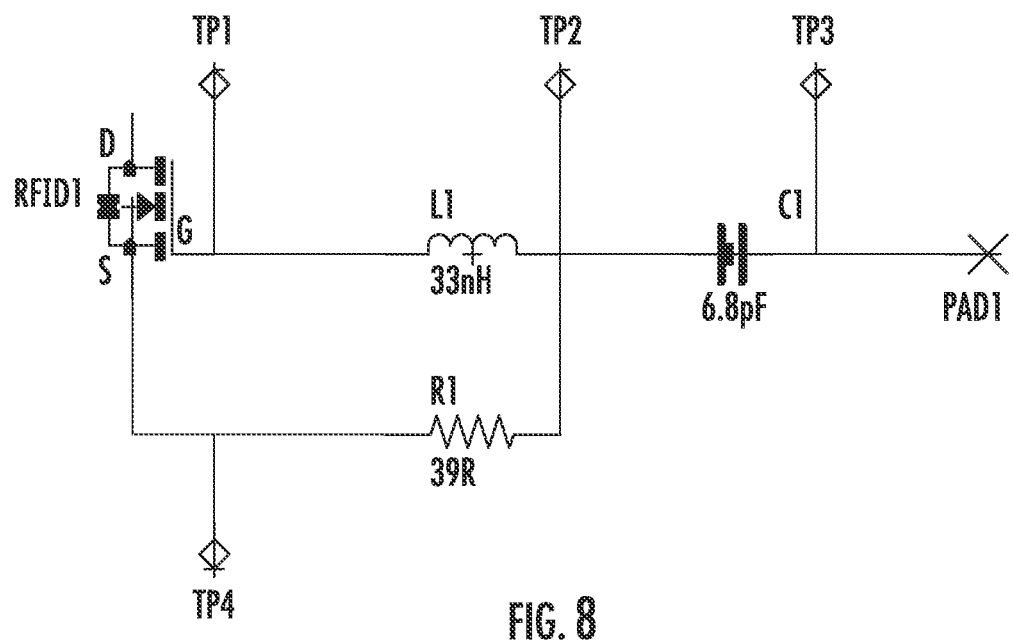
FIG. 8 is a schematic view of an exemplary circuit for an RFID faster in accordance with the present disclosure for use with a T-matching network.
Figure 9:
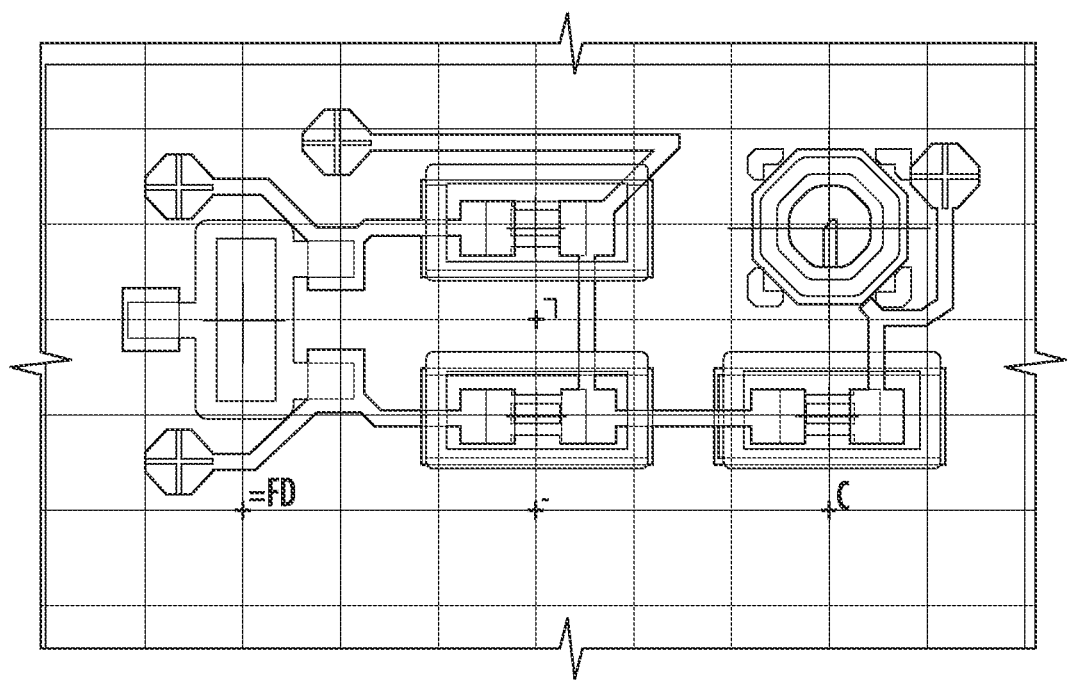
FIG. 9 is a schematic view of an exemplary printed circuit board footprint for an RFID fastener in accordance with the present disclosure for use with a T-matching network.

Initially, a circuit with a T-matching networks, as shown in FIG. 8, was constructed by designing the printed circuit board (PCB) shown in FIG. 9 and attaching the necessary components. Although this PCB was originally designed for a T-matching network, it was determined that a single inductor could be a more cost-effective option. Accordingly, the testing PCB was constructed in such a way to fit the circuit design in FIG. 5 instead. The RFID chip was soldered to the PCB, a pin was soldered into the via hole and then soldered into the screw and finally a wire was soldered on either end of the RF signal connector of the RFID chip and the via hole attached to the screw, thus creating the circuit described by FIG. 5. The wire was then twisted gently to create a circular loop in the center, acting as a loop inductor, to construct a transponder.

Next the RFID reader, the ALR-H450 by Alien, was placed perpendicular with the transponder. The wire was twisted tighter and looser to modulate the inductance while the Geiger function of reader was used simultaneously to discover the maximum distance away from the screw that a consistent, even faint, signal was picked up. For the various inductances the diameter of the loop was recorded along with the maximum distance of minimum communication. The diameter of the loop was then converted into inductance using Equation 11, where D is the diameter of the loop, d is the diameter of the wire, and $\mu\_r$ is the relative permeability of the wire.

$$L\_loop = \mu\_o \mu\_r (D/2)(\ln(8D/d) - 2) \quad (11)$$

Figure 10:
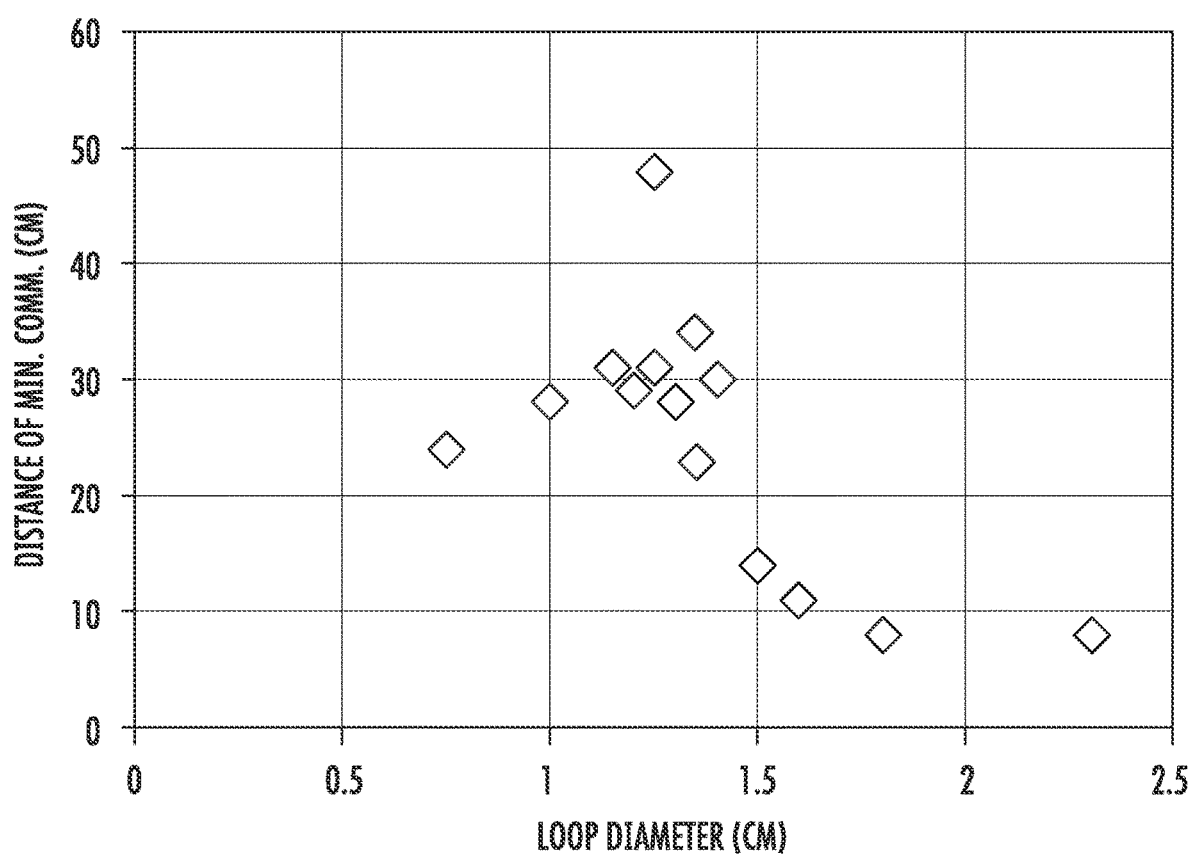
FIG. 10 is a graphical representation of the relationship between loop diameter and maximum distance of minimum read communication, in accordance with the present disclosure, specifications of which are provided in FIG. 12.

A scatter plot of the loop diameter vs. maximum distance of minimum communication data for a screw having a diameter of 0.9 cm and a length of 7.6 cm is shown in FIG. 10. It can be seen from FIG. 10 that at its peak performance, this screw can be used as an RFID antenna at upwards of 0.5 m away.

In summary, the process for finding an optimal inductance of a matching network is set forth in the steps below:

1. Develop a PCB similar to the one shown in FIG. 9, except with only space for the bottom right component, i.e. nothing connected to the top port of the RFID chip
2. Drill a hole in the screw large enough for a pin
3. Solder the Alien RFID chip to the PCB, solder a pin through the via into the screw
4. Attach a wire between the RFID chip and the via hole, twisting the wire to form a loop
5. Set the ALR-H450 reader to Geiger mode
6. Record the diameter of the wire loop
7. Set the screw upright and aim the reader perpendicularly at it, as shown in FIG. 9
8. Move the reader toward the screw, holding the trigger button, until the Geiger counter beeps
9. Record the distance from the screw that the reader first read the RFID chip
10. Twist the loop wire to a new diameter
11. Repeat steps 6-10 until a loop diameter has been found that maximizes the distance at which the RFID chip can be read
12. Convert this diameter into an inductance using Equation 11

Example 3—Working Prototype

Figure 14:
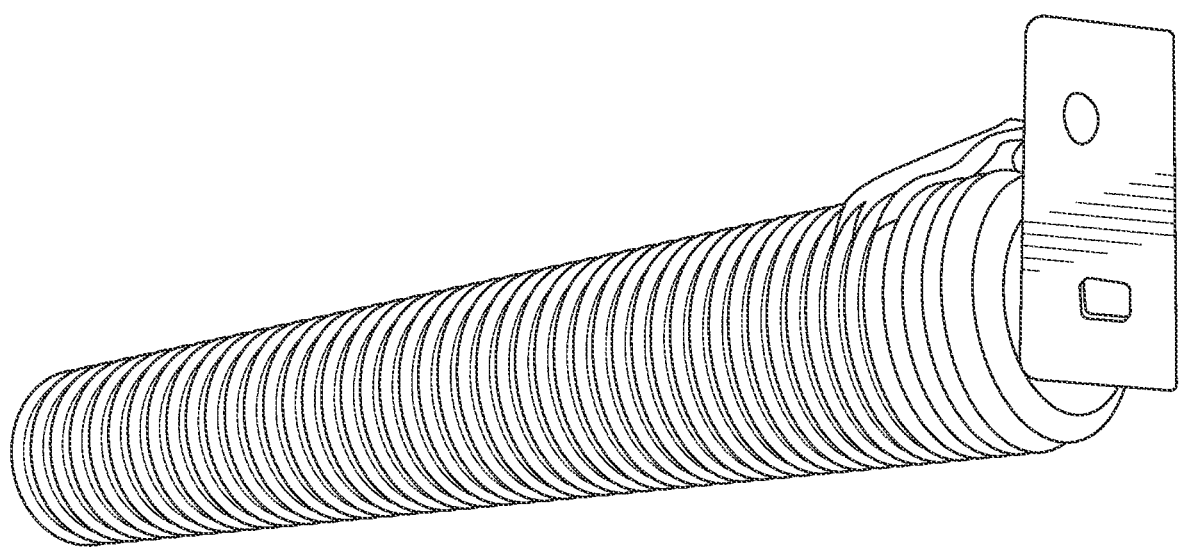
FIG. 14 is pictorial representative of one example of a working prototype in accordance with the present disclosure.

A first working prototype, as shown in FIG. 14, was constructed using a 0.9 cm zinc-coated steel screw. A PCB was soldered to the screw, and a T-matching-network was also used. However, it was determined that a zinc-coated screw having a diameter of 0.7 cm and the use of a tunable inductor matching network, as described above, provided the best working prototype. The working prototype was capable of consistent communication with the ALR-H450 reader at approximately 0.5 m.

While various embodiments of the invention have been particularly shown and described, it will be understood by those skilled in the art that various changes in form and details may be made therein without departing from the spirit and scope of the invention. For example, the materials disclosed herein may be readily changed, as may the dimensions and geometric configurations. The fastener itself may have a different configuration other than that which is illustrated, and the microchip may be secured to the surface of, or embedded within the head, or the shaft, or both the head and shaft of the fastener. Also elements that are shown in combination may be shown in different combinations or may be eliminated. Elements shown as unitary (or a singular piece) may also be composed of more than one piece, and those composed of more than one piece may be made unitary. Thus, the details of these components as set forth in the above-described examples, should not limit the scope of the claims.

Those skilled in the art will appreciate that the conception, upon which this disclosure is based, may readily be utilized as a basis for designing other products without departing from the spirit and scope of the invention as defined by the appended claims. Therefore, the claims are not to be limited to the specific examples depicted herein. For example, the features of one example disclosed above can be used with the features of another example. Furthermore, various modifications and rearrangements of the parts may be made without departing from the spirit and scope of the underlying inventive concept. For example, the geometric configurations disclosed herein may be altered depending upon the application, as may the material selection for the components. Thus, the details of these components as set forth in the above-described examples, should not limit the scope of the claims.

Further, the purpose of the Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed is:

1. An RFID fastener comprising:
   a semiconductor chip;
   an antenna comprising a metal fastener having a proximal end and a distal end and configured to secure two or more objects together; and
   wherein the semiconductor chip is in communicative connection with the antenna such that the RFID fastener transmits modulated RF signals from the semiconductor chip to an external reader during use.

2. The RFID fastener of claim 1, wherein the semiconductor chip is a passive chip and receives RF energy from the external reader that powers the semiconductor chip without physical connection to a power supply.

3. The RFID fastener of claim 2, wherein the semiconductor chip operates in ultra-high frequencies at approximately the 300 MHz-1 GHz range.

4. The RFID fastener of claim 2, wherein the semiconductor chip operates in high frequencies at approximately the 3-30 MHz range.

5. The RFID fastener of claim 2, wherein the semiconductor chip operates in low frequencies at approximately the 30-400 kHz range.

6. The RFID fastener of claim 1, wherein the semiconductor chip is in communicative connection with one or more sensors, the one or more sensors selected from a group consisting of acoustic, sound, vibration, air flow, temperature, radiation, steam, stress, pressure, torque, displacement, chemical, pH, electromagnetic, and ultrasonic wave sensors.

7. The RFID fastener of claim 1, wherein the semiconductor chip is separate from the metal fastener and is connected to the metal fastener by one or more connectors that provide the communicative connection between the semiconductor chip and the metal fastener.

8. The RFID fastener of claim 1, wherein the metal fastener comprises:
   a head comprising a first diameter and a top surface and a side surface;
   an elongate body extending from the head including an outer surface that is either smooth or threaded; and
   wherein the semiconductor chip fits on or within a desired mounting location of the metal fastener without extending beyond dimensions of the top surface, side surface or outer surface of the metal fastener.

9. The RFID fastener of claim 8, wherein the desired mounting location is the head of the metal fastener, and the semiconductor chip is supported within a recess in the head of the metal fastener so that the semiconductor chip is generally flush with the top surface of the head.

10. The RFID fastener of claim 8, wherein the desired mounting location is a shaft of the metal fastener.

11. The RFID fastener of claim 10, wherein the semiconductor chip is supported in a recess within the distal end of the shaft, such that the semiconductor chip does not extend beyond a bottom surface of the shaft.

12. The RFID fastener of claim 8, wherein the semiconductor chip is sealed with a protective sub stance.

13. The RFID fastener of claim 1, wherein the metal fastener comprises electrically conductive material disposed at least on an outer layer of the metal fastener, the electrically conductive material having a resistance less than about 5 ohms.

14. The RFID fastener of claim 13, wherein the electrically conductive material is selected from a group including titanium, A-286, nickel-chromium alloys, super alloys, stainless steel, alloy steel, aluminum, zinc-coated steel, titanium nitride-coated titanium, and naval brass.

15. The RFID fastener of claim 1, wherein the semiconductor chip stores information related to the metal fastener.

16. The RFID fastener of claim 15, wherein the information is selected from a group consisting of status of the metal fastener, performance of the metal fastener, identifying information, manufacturing information, recall history, and instructions for use.

17. The RFID fastener of claim 15, wherein the information is displayed to an operator and stored in an electronic record.

18. The RFID fastener of claim 1, wherein the antenna is a meandered line antenna.

19. The RFID fastener of claim 1, further comprising an impedance-matching device constructed and arranged to optimize a power transfer between the semiconductor chip and the antenna.

20. The RFID fastener of claim 19, wherein the impedance-matching device is selected from a group consisting of transformers, resistors, inductors, capacitors, and transmission lines.

* * * * *